May 7, 1946.   A. H. ADAMS   2,399,843
EMERGENCY VALVE
Filed Nov. 9, 1942
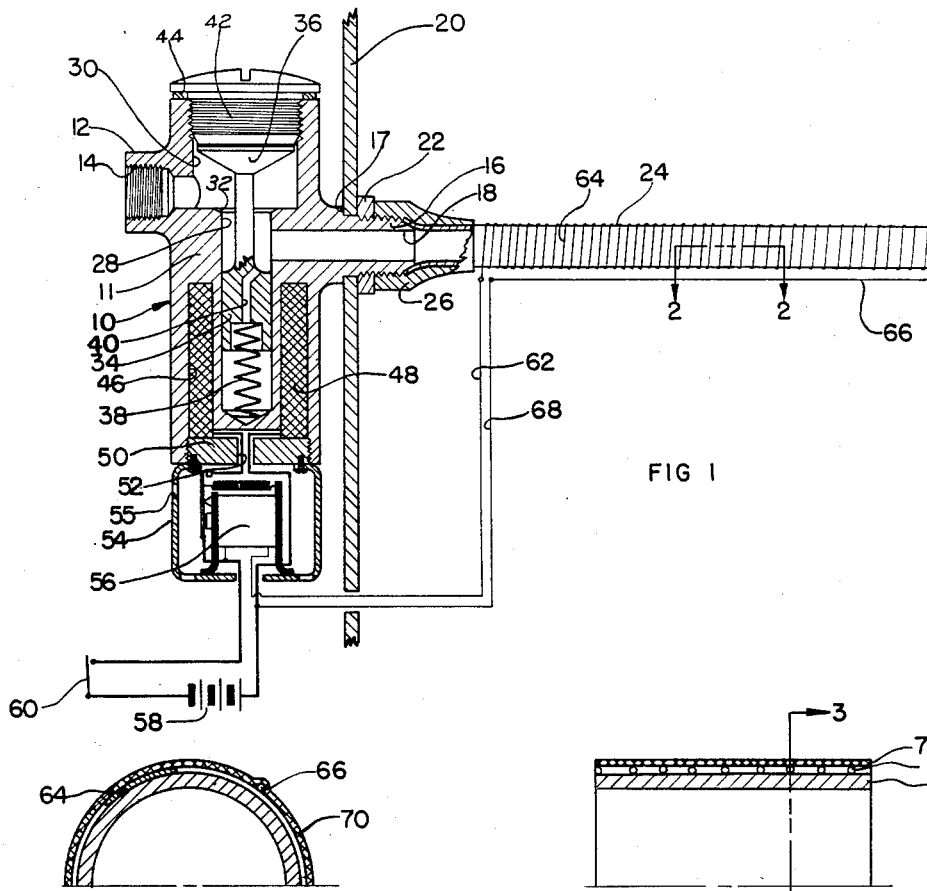
FIG 1
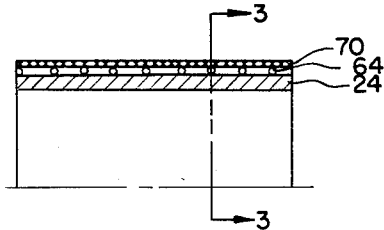
FIG 2
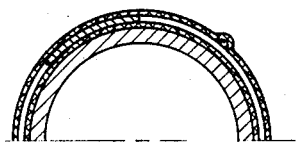
FIG 3
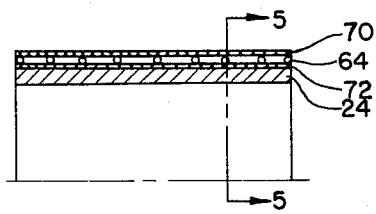
FIG 4
FIG 5
ARBEN H. ADAMS —INVENTOR.
BY H. W. Brelsford Patented May 7, 1946

2,399,843

UNITED STATES PATENT OFFICE 2,399,843

EMERGENCY VALVE

Arben H. Adams, North Hollywood, Calif., assignor, by mesne assignments, to Bendix Aviation Corporation, South Bend, Ind., a corporation of Delaware Application November 9, 1942, Serial No. 465,013

1 Claim. (Cl. 137—139)

This invention relates to fluid control valve and rupturable conduit systems and more particularly to the valve for interrupting the flow through the conduit system.

The invention is particularly applicable to military airplanes. In such airplanes hydraulic and pneumatic power systems are used for operating flaps, retracting landing gear and the like. Often the conduits for such fluids are ruptured by enemy fire, and unknown to the pilot all available fluid under pressure may run out of the break in the conduits, exhausting the supply for necessary operations. The present invention provides means to stop the flow of fluid the instant the line is broken, so that no pressure fluid is wasted. Although especially suitable for military use the present invention may well be applied to other uses, such as the hydraulic brake conduits of automotive vehicles, inasmuch as an accident may damage such conduits and render a braking system inoperative.

Many attempts have been made to provide automatic shutoff valves for fluid lines. The principal development has been along the lines of shut off by flow of fluid in an amount such as might result from a break in the line. Such control is inherently unsuited for aircraft, inasmuch as the maximum possible flow is required for many functions. For example, the wheels of airplanes must be retracted in the shortest time possible, and many specifications call for retraction in several seconds. Also, under some conditions partial vacuums are created in some actuating cylinders, resulting in a fluid flow greater than would result if the conduit were broken. For these reasons, shutoff valves based on fluid flow are limited in application.

The present shutoff valve is independent of fluid flow, and it is actuated only by a break in the fluid line. The invention operates immediately and does not waste fluid as in a flow controlled valve, wherein fluid must flow out of the break before the valve is operated. The invention consists in wrapping fine wire about a length of tubing and passing electrical current through the wire. When the tube is broken by gun fire, or otherwise, the wire will also be broken, shutting off the current and operating the shutoff valve of this invention.

It is therefore an object of the invention to provide an automatic shutoff valve for interrupting flow in a fluid system when a break occurs in the fluid tubing.

Another object is to provide a shutoff valve that is operated independently of the flow in the tubing or valve.

A further object is to provide a shutoff valve for breaks in a line, which valve may also be operated for use as a disconnect coupling.

An object of the invention, also, is to provide a light weight and inexpensive shutoff for breaks in fluid lines, which shutoff is infallible in operation.

In the drawing forming a part of this specification:

Figure 1 is an elevation view of the solenoid valve of this invention shown in full section, with a length of tubing attached;

Figure 2 is a longitudinal section along the line 2—2 of the tubing of Figure 1, showing the construction of the same;

Figure 3 is a transverse section of the tubing along the lines 3—3 of Figure 2;

Figure 4 is a longitudinal section of a modified form of tubing forming a part of this specification; and Figure 5 is a section along the lines 5—5 of Figure 4.

Referring to Figure 1, a valve 10 including a housing 11 has an inlet boss 12 with an inlet port 14 and an outlet boss 16 with an outlet port 18. A shoulder 17 of boss 16 rests against a hole in fire wall 20. Often protective armor is used in place of a fire wall, and in that event the valve is protected and only the exposed tubing is subject to damage. A nut 22 holds the valve 10 in place on wall 20. Tubing 24 is attached to boss 16 by a nut 26 which also acts to lock nut 22 in place.

Housing 11 is centrally drilled as at 28, which hole communicates with exhaust port 18. The upper part has an enlarged drilled hole 30 connecting with inlet port 14. A valve seat 32 is formed at the junction of holes 28 and 30. Placed within hole 28 is a ferrous piston 34 having a poppet portion 36. A light spring 38 urges piston 34 and poppet 36 upwardly and is sufficiently strong to overcome inertia forces when the airplane is maneuvering. A passage 40 in piston 34 allows the escape of trapped fluid when the piston is pulled downwardly as will be next explained. A cap 42 closes the upper end of hole 30 and is sealed against fluid loss by gasket 44.

Formed in the bottom of housing 11 is an annular recess 46 in which are placed coil windings 48. A threaded plug member 50 is screwed in the bottom of recess 46 to hold coil 48 in place and has a central hole 52 through which lead wires pass. When direct current electricity is passed through coil 48 a magnetic field is created, drawing piston 34 toward the center of the coil against the compression of spring 38. This causes poppet 36 to contact seat 32, shutting off fluid flow.

Secured to the bottom of plug 50 is a shell 54 to which is fastened a normally energized relay 56 controlling current flow to coil 48. The positive side of a battery 58 supplies current to relay 56 and coil 48 through a switch 60. Coil 48 is connected directly to the negative side of battery 58, but the relay 56 is connected through a wire 62 leading to conduit 24. Wire 62 is soldered to a wire 64 wrapped spirally around tube 24. Wire 64 in turn is soldered to a wire 66 passing along the tube 24 until it reaches wire 62. Wire 66 is there soldered to a wire 68 leading directly to the negative side of battery 58.

The construction of tube 24 is shown in detail in Figures 2 and 3. In Figure 2 is will be noted that fabric tubing 70 covers the metal tubing 24 and the wires 64. This fabric tubing may be of the type which is used in electrical wiring to cover a wire or plurality of wires. Figure 3 shows the return wire 66 also. There it will be noted that this wire merely overlies the spirally wound wire 64, and is covered by fabric tubing 70 also. In manufacture, the tubing 24 is wound with spiral wire and the lengthwise wire 66 is also laid upon the metal tubing. The fabric covering 70 is then woven around the tubing and wire, resulting in a finished product which may be cut to commercial lengths, such as several hundred feet in length. The wires 64 and 66 is preferably insulated by enamel finish and extremely fine, so that an average length of tubing, for example 10 to 15 feet, may have a relatively high resistance and absorb very little power from the battery 58. The spacing of wire 64 on tube 24 may be adjusted to the type of damage encountered. If injury is due to fine splinters, it must be wound closely. If a direct bullet hit is necessary, a spacing of ⅛ inch or ¼ inch may be sufficient.

Another form of tubing is shown in Figures 4 and 5. This tubing includes an additional fabric covering 72, covering the metal tubing 24 directly, and wire 64 may be wound on this fabric tubing. Thereafter fabric tubing 70 may be applied over wire 64. This embodiment of the tubing is for heavy duty use such as when a tubing must be distorted through many turns to fit a particular installation. The inner tubing 72 cushions the wire 66 against any blows so that the wire 64 will not be severed when receiving a hard blow.

In actual use, the tubing may be cut with a saw or any other convenient tool to the desired length, cutting through fabric covering 70 or 72 and through the spiral wire 64 and the lengthwise wire 66. At one end of the tube, the end remote from control valve 10, the wires 64 and 66 are soldered together, completing a return circuit to the other end of the length of tube severed. At the other end wire 66 is soldered to wire 68 and spiral wire 64 is soldered to wire 62, completing the circuit to control relay 56.

The two wire circuit is preferable to grounding the wire to the frame and grounding the frame in turn to the source of power. This is true because currents flowing through the frame severely add to corrosion of joints and materials, weakening the same, although it is possible from an operational standpoint.

The operation of the device is as follows. When the pilot desires to fly the airplane in which the device is mounted, he closes switch 60. This causes current to flow to relay 56 and coil 48. Since the inductance of coil 48 is greater than relay 56, the relay will open before coil 48 can pull poppet 36 to its seat. Inlet port 14 is connected to a source of fluid under pressure. Fluid, either pneumatic or hydraulic, may then flow through the valve 10 and its attached tubing 24.

If the airplane should now be subject to gun fire, valve 10 would be protected, since it is back of armor wall 20. Tube 24 would be exposed, however, and may be broken by bullets or splinters. If a bullet strikes tube 24, knocking a hole in it or severing it, the wires 64 would be severed. This causes relay 56 to lose its energization and close, closing the circuit to coil 48. Coil 48 creates a magnetic field drawing piston 34 to the center of it. This draws poppet 36 to its seat 32 and fluid under pressure maintains the poppet in a seated position.

When the airplane returns to the ground, the tube 24 may be replaced with a new tube, after severing the connections to wires 62 and 68. Thereafter the coil 48 may be de-energized and pressure in port 14 relieved. Spring 38 will then cause the poppet 36 to move upwardly and the conduit 24 is again ready for use.

Even when a conduit is not damaged it may be necessary to remove the same. In this event, it is also desirable not to lose hydraulic fluid from the system, which may be present at a low or atmospheric pressure. For this occasion any simple tool may be inserted in hole 55 in relay housing 50, to close relay 56. This causes the poppet to seat, and if tube 24 is thereafter removed no fluid will be lost from the system. This same result may also be obtained by cutting wire 62 and 68, a necessary preliminary before removing conduit 24. In any event therefore valve 10 acts as a convenient disconnect coupling to prevent wasting of fluid.

When the airplane is not in use, switch 60 is kept open to prevent waste of current.

It is obvious that many different embodiments of the invention may be used. For example, electric current may be passed through the tube 24 itself, and severing of the tube would cause valve 10 to act. Or, the covering wire may be lengthwise as well as spiral. Also, actuation of the valve is not necessarily dependent upon the conduit connected to it, but may be operated by damage to a remote conduit.

Although this invention has been described with reference to particular embodiments thereof, it is not limited to the same nor otherwise except by the terms of the following claim.

I claim:

A solenoid valve for use in a shutoff system comprising a housing with an inlet and an outlet port and a seat formed between them, a poppet therein normally open and out of the stream of flow, a magnetically responsive shank on said poppet, a solenoid near said shank, and means including said solenoid and shank for closing said poppet against the seat, in which the poppet is on the inlet side of said seat and said seat constitutes the sole fluid passage between said inlet and outlet ports, whereby the poppet is uncontrolled by fluid flow through the open valve but is urged against its seat in response to differential pressure between the said inlet and outlet ports after the poppet has been seated by said means.

ARBEN H. ADAMS.